US005500705A

United States Patent [19]

Stephenson, III

[11] Patent Number: 5,500,705
[45] Date of Patent: Mar. 19, 1996

[54] APPARATUS AND METHOD FOR SECURING A THRUST FILM CARTRIDGE

[75] Inventor: Stanley W. Stephenson, III, Spencerport, N.Y.

[73] Assignee: Eastman Kodak Company, Rochester, N.Y.

[21] Appl. No.: 370,085

[22] Filed: Jan. 9, 1995

[51] Int. Cl.⁶ .......................... G03B 17/02; G03B 19/10; G03B 17/26
[52] U.S. Cl. ..................... 354/288; 354/174; 354/275
[58] Field of Search ................................ 354/174, 275, 354/288

[56] References Cited

U.S. PATENT DOCUMENTS

| | | |
|---|---|---|
| 1,437,989 | 12/1922 | Nelson . |
| 1,527,476 | 2/1925 | Gianetto . |
| 2,505,661 | 4/1950 | Briskin et al. . |
| 2,728,263 | 12/1955 | Schmitt, Jr. et al. . |
| 5,049,914 | 9/1991 | Dassero . |
| 5,231,438 | 7/1993 | Smart . |
| 5,248,108 | 9/1993 | Zander . |
| 5,319,407 | 6/1994 | Dirisio . |
| 5,357,303 | 10/1994 | Wirt . |
| 5,359,378 | 10/1994 | Zander . |

FOREIGN PATENT DOCUMENTS 6-130558  6/1994  Japan .

*Primary Examiner*—Monroe H. Hayes
*Attorney, Agent, or Firm*—Peter J. Bilinski

[57] ABSTRACT

An apparatus for securing a thrust film cartridge and for moving a film door between open and closed positions. The apparatus includes a camera body adapted to receive a thrust film cartridge, a camera door interconnectable with the camera body, and an actuating device. The actuating device includes a latch member, a lug member operatively associated with the latch member, a handle member operatively associated with the latch member, and a force limiting mechanism for limiting the force which can be applied by the handle member on the latch member. The latch member is movable between a locked position, to lock the camera door in the closed position, and an unlocked position, to allow the camera door to move between the open and closed positions. The lug member is engageable with a film door of a thrust film cartridge to move the film door between open and closed positions. The handle member is movable by a user of the apparatus to provide an unlocking force to the latch member and to move the latch member from the locked position to the unlocked position.

21 Claims, 5 Drawing Sheets

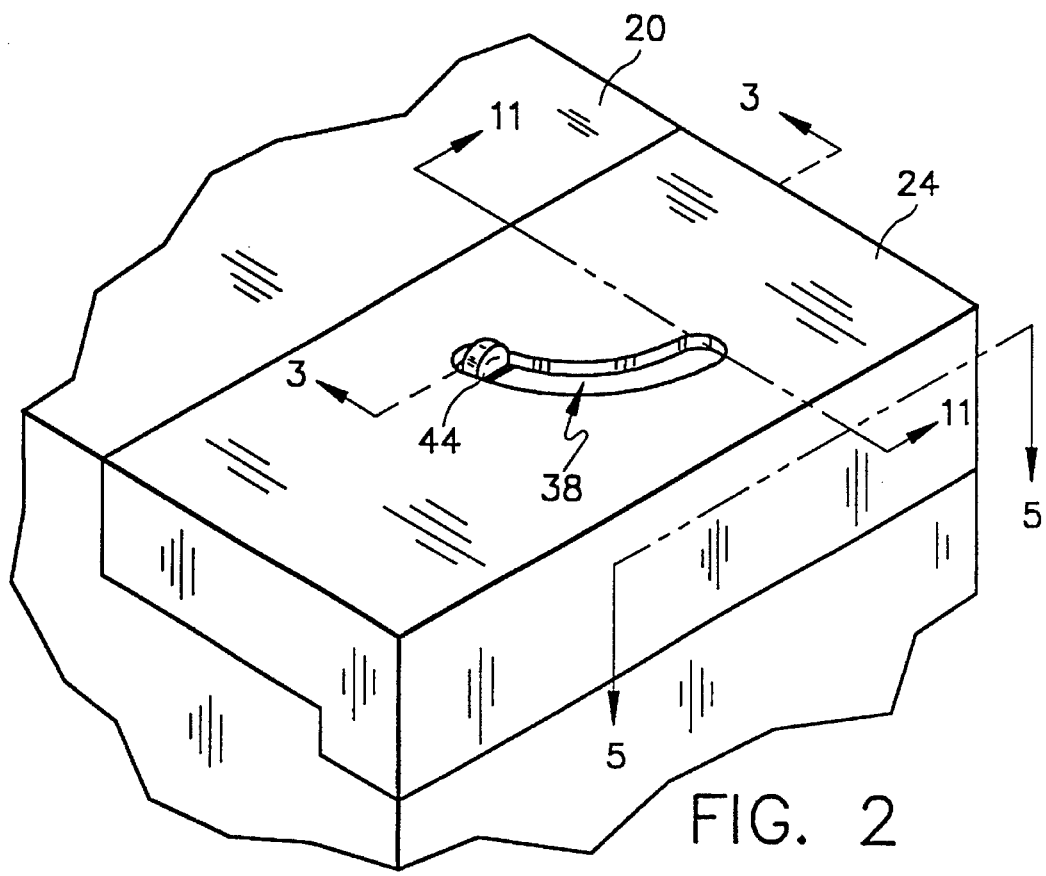
FIG. 2
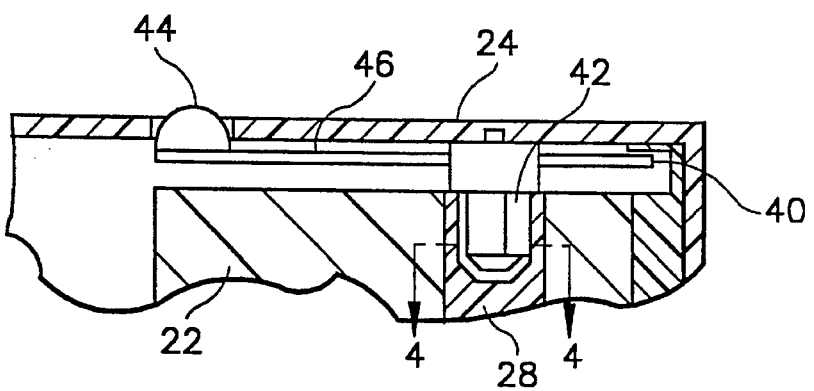
FIG. 3
FIG. 4

APPARATUS AND METHOD FOR SECURING A THRUST FILM CARTRIDGE

FIELD OF THE INVENTION

The present invention generally relates to the field of thrust film cameras and, more specifically, to mechanisms for ensuring that a camera door cannot be opened when film is protruding from a thrust film cartridge positioned within the camera.

BACKGROUND OF THE INVENTION

Thrust film cartridges utilizing film door light traps have been used in the photographic industry as an alternative to conventional film cartridges utilizing plush light traps. Typical thrust film cartridges include an outer shell having a longitudinally-extending opening for allowing for the exit of film from the cartridge. A cartridge spool is rotatably positioned within the outer shell to accommodate a roll of film. A film door is rotatably mounted adjacent the opening and is movable between a closed position, wherein a light tight seal is formed, and an open position, wherein film is allowed to exit the cartridge.

Thrust film cartridges are particularly useful for allowing rewinding and subsequent reloading of film before the complete roll of film is used. Cameras having the ability to rewind and reload partially-used rolls of film are sometimes referred to as mid-roll interrupt ("MRI") cameras. Such a camera is disclosed in commonly-assigned U.S. Pat. Nos. 4,947,197 to Smart et al. and 4,965,600 to Smart et al., which are incorporated in their entirety herein by reference.

In order to prevent opening of the film door when the camera door is open, some cameras provide mechanisms for ensuring that the camera door is securely closed before the film door may be opened. In addition, such cameras attempt to ensure that the film door is securely closed before the camera door may be opened. It is further desirable to provide a mechanism wherein the film door cannot be forced closed when film is extending from the thrust film cartridge.

Commonly-assigned U.S. Pat. No. 5,231,438 to Smart, the specification of which is incorporated in its entirety herein by reference, discloses such an apparatus wherein a latch for securing the camera door locked and closed is also responsible for opening and closing the film door of a thrust film cartridge. Specifically, the latch is forced into the locked position by the action of a slide plate, and the slide plate is forced into the locked position by the action of a plate spring. A slide button is utilized to force the slide plate into the unlocked position, and a separate button spring is provided for biasing the slide button into the locked position. A latch spring forces the latch from the locked to the unlocked position. The latch spring has a spring force which is high enough to rotate the latch and thereby open the film door and camera door under normal operating conditions, but which is not high enough to force the film door closed if film is extending from the cartridge. Accordingly, if film is extending from the cartridge, the latch will not move completely to the open position and, therefore, will not allow the camera door to be opened. As is evident from the above description, the camera disclosed in Smart utilizes six elements to provide the above-noted features.

With the popularity of inexpensive, manually-wound cameras, it is typically desirable to design new camera mechanisms to be simple and inexpensive. Accordingly, it can be appreciated that it would be desirable to provide a simple, inexpensive mechanism for ensuring that the camera door is securely closed whenever the film door of a thrust film cartridge is open, and for ensuring that the film door is securely closed before the camera door may be opened. In addition, it would be desirable if the film door cannot be forced closed, and therefore the camera door cannot be opened, when film is extending from the thrust film cartridge.

SUMMARY OF THE INVENTION

In accordance with the present invention, an apparatus for securing a thrust film cartridge is provided which achieves one or more of the above-stated objectives. In one aspect, the apparatus includes a camera body having a cartridge compartment adapted to receive a thrust film cartridge, and a camera door interconnectable with the camera body. The camera door is movable relative to the camera body between an open position, to allow a thrust film cartridge to be inserted into and removed from the cartridge compartment, and a closed position, to form a substantially light tight seal over the cartridge compartment. The apparatus further includes an actuating device having a latch member, a lug member operatively associated with the latch member, a handle member operatively associated with the latch member, and a force limiting mechanism for limiting the force which can be applied by the handle member on the latch member. The latch member is movable between a locked position, to lock the camera door in the closed position, and an unlocked position, to allow the camera door to move between the open and closed positions. The lug member is engageable with a film door of a thrust film cartridge to move the film door between open and closed positions. The handle member is movable by a user of the apparatus to provide an unlocking force to the latch member and to move the latch member from the locked position to the unlocked position. By providing a handle member which can apply an unlocking force to the latch member, along with the provision of a force limiting mechanism, the present invention avoids the need for numerous moving parts, such as multiple springs and slide plates.

In one embodiment, the actuating device is mounted on the camera door. For example, the actuating device may be pivotally mounted on the camera door, in which case the latch member pivots between the locked and unlocked positions. When the actuating member pivots, the handle member can apply a torque to the latch member, the torque preferably being about 2 oz-in or less, more preferably about 1 oz-in or less, by virtue of the force limiting mechanism. The camera door can further include a slotted opening (e.g., an arcuate opening) for allowing operative interconnection between the handle member and the flexible member.

In another embodiment, the force limiting mechanism includes a flexible member operatively interconnecting the handle member to the latch member. For example, the flexible member can be pivotally positioned on an interior of the apparatus, and the handle member can be at least partially exposed to an exterior of the apparatus. In one embodiment, the handle member includes a lever member pivotally positioned on an exterior of the apparatus. In another embodiment, the flexible member is tortuous in shape. In yet another embodiment, the flexible member includes a torsion spring operatively interconnecting the handle member to the latch member.

In another aspect of the present invention, the apparatus includes a camera body having a cartridge compartment adapted to receive a thrust film cartridge, and a camera door interconnectable with the camera body. The camera door is movable relative to the camera body between an open position, to allow insertion and removal of a thrust film cartridge from the cartridge compartment, and a closed position, to form a substantially light tight seal over the cartridge compartment. The apparatus further includes an actuating device including a latch member, a lug member operatively associated with the latch member, a handle member operatively associated with the latch member, and a torque limiting mechanism for limiting the torque which can be applied by the handle member to the latch member. The latch member is pivotable between a locked position, to lock the camera door in the closed position, and an unlocked position, to allow the camera door to move between the open and closed positions. In addition, the lug member is engageable with a film door of a thrust film cartridge to rotate the film door between open and closed positions. The handle member is pivotable by a user of the device to cause pivoting of the latch member between the locked and unlocked positions.

In one embodiment, the handle member is pivotable by a user of the apparatus to provide an unlocking torque to the latch member and to move the latch member from the locked position to the unlocked position. Preferably, a torque applied by the handle member to the latch member is 2 oz-in or less, and more preferably about 1 oz-in or less. In another embodiment, the torque limiting mechanism includes a flexible member operatively interconnecting the handle member to the latch member.

The actuating device can be advantageously mounted on the camera door. In such an embodiment, the camera door can include a slotted opening (e.g., an arcuate opening) for allowing access to the handle member.

BRIEF DESCRIPTION OF THE DRAWINGS

FIG. 2 is a perspective view of the apparatus shown in FIG. 1.

FIG. 3 is a section view taken along line 3—3 in FIG. 3.

FIG. 4 is a section view taken along line 4—4 in FIG. 3.

DETAILED DESCRIPTION

Figure 1:
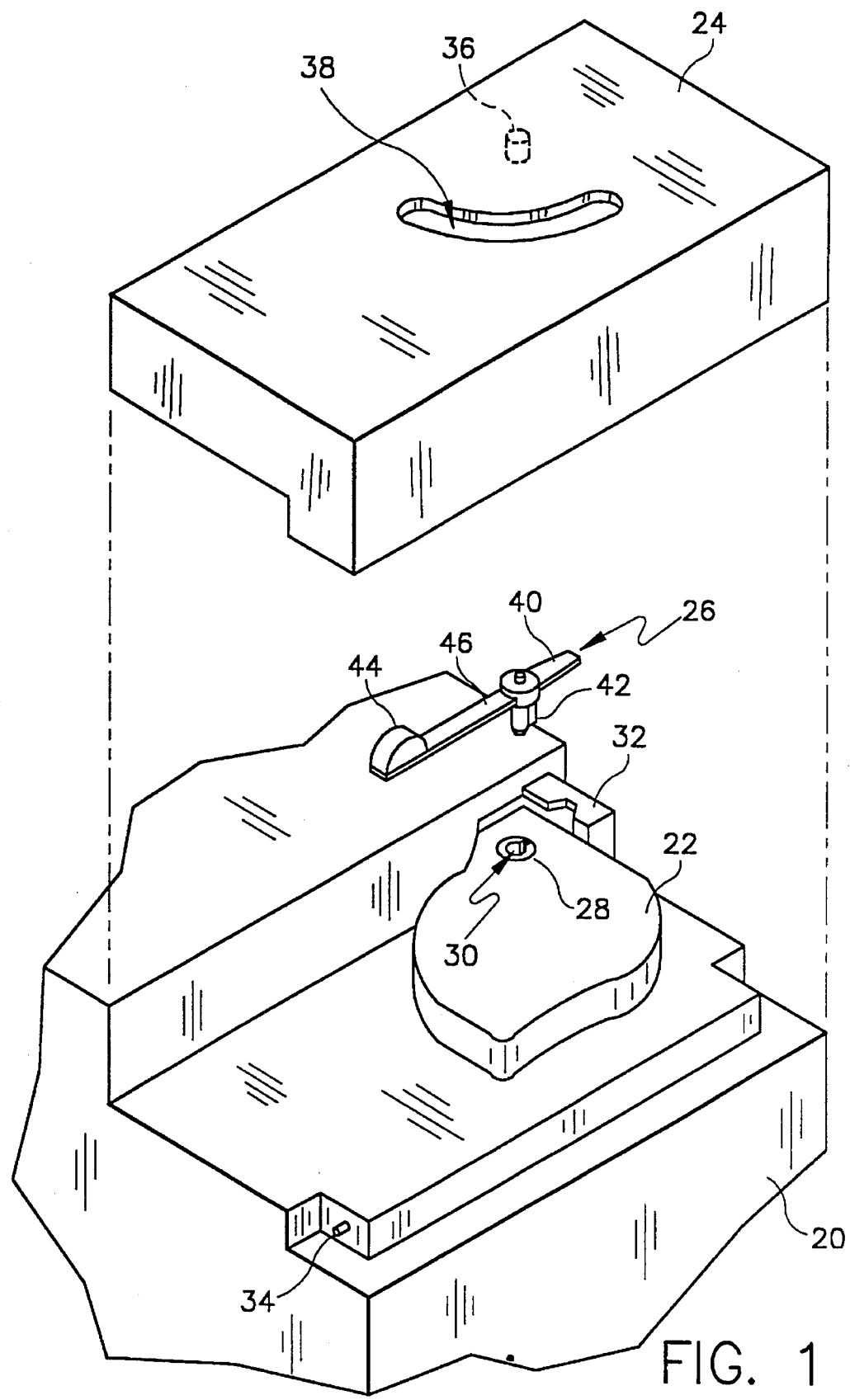
FIG. 1 is an exploded assembly perspective view of one embodiment of the present invention.

One embodiment of the present invention is illustrated in FIGS. 1–12. Referring specifically to FIGS. 1–4, the illustrated apparatus generally includes a camera body 20, adapted to receive a thrust film cartridge 22, and a camera door 24 pivotally mounted to the camera body 20. An actuating device 26 is provided for selectively locking and unlocking the camera door 24 to the camera body 20, and for selectively opening and closing a film door 28 on the thrust film cartridge 22 positioned within the camera body 20. The actuating device 26 is specifically designed to: prevent opening of the film door 28 when the camera door 24 is open, prevent opening of the camera door 24 when the film door 28 is open, and further prevent unlocking of the camera door 24 when film 48 is protruding from the thrust film cartridge 22, as will be described below in more detail.

As used herein, the term "thrust film cartridge" is intended to refer to film cartridges which are capable of selectively thrusting film out of and rewinding film into the cartridge compartment through an opening which is selectively closable to prevent light from entering the cartridge and damaging the film.

The camera body 20 of the illustrated embodiment includes a cartridge compartment for receiving a thrust film cartridge 22. The thrust film cartridge 22 may include any appropriate cartridge wherein a film door 28 acts to prevent the entrance of light into the thrust film cartridge 22 when the door 28 is closed. The film door 28 of typical thrust film cartridges is accessible from the exterior of the cartridge 22 to allow for movement (i.e., opening and closing) of the film door 28. For example, the illustrated film door 28 includes a keyed socket 30, coaxial with the film door 28, that can be engaged and rotated from the exterior of the cartridge 22. An example of a thrust film cartridge is disclosed in the commonly-assigned U.S. Pat. No. 5,231,438 to Smart, which is incorporated in its entirety herein by reference.

Figure 5:
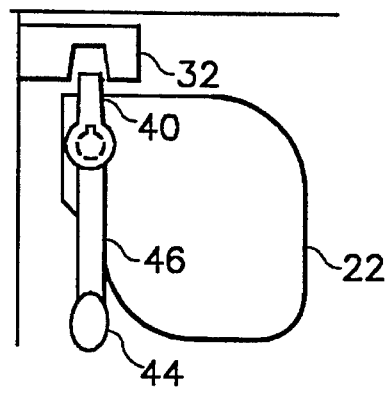
FIG. 5 is a view taken along line 5—5 in FIG. 2 with an actuating device in the unlocked position.

A locking shelf 32 is formed into the camera body 20 adjacent the thrust film cartridge 22. The locking shelf 32 is designed to receive a latch member 40 of the actuating device 26, as described below in more detail. As can be seen in FIG. 5, the locking shelf 32 is positioned immediately adjacent the latch member 40 when the latch member 40 is in the unlocked position. Accordingly, the latch member 40 will slide under the locking shelf 32 almost immediately upon rotation of the latch member 40, thereby ensuring that the camera door 24 is locked before the film door 28 is opened.

The camera door 24 is attachable to the camera body 20 to form a light tight seal. In the illustrated embodiment, the camera door 24 is pivotally attached to the camera body 20 at a hinge 34. The camera door 24 is pivotable on the hinge 34 from an open position, wherein a thrust film cartridge 22 may be loaded into or unloaded from the camera body 20, to a closed position, wherein a light tight seal is formed over the cartridge compartment. The camera door 24 includes a pivot boss 36 on an interior surface thereof for pivotally engaging the actuating device 26. In addition, the camera door 24 includes an arcuate opening 38 having a center of rotation which generally coincides with the pivot boss 36. The arcuate opening 38 is designed to allow access to the handle member 44 of the actuating device 26 from the exterior of the camera.

The actuating device 26 of the present invention is designed to allow selective locking and unlocking of the camera door 24. The actuating device 26 includes a latch member 40 for selectively locking and unlocking the camera door 24 to the camera body 20, a lug member 42 engageable with a film door 28 (e.g., the keyed socket 30) in the thrust film cartridge 22, and a handle member 44 engageable by a user of the apparatus. In addition, in order to limit the amount of force that can be applied by the handle member 44 on the latch and lug members 40,42, the illustrated embodiment includes a flexible member 46 interconnecting the handle member 44 to both the lug member and the latch member 40.

Figure 6:
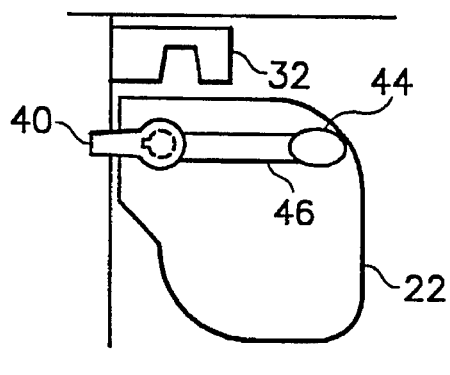
FIG. 6 is the view of FIG. 5 with the actuating device in the locked position.

The illustrated actuating device 26 is rotatably mounted to the pivot boss 36 of the camera door 24. Referring specifically to FIGS. 5 and 6, rotation of the actuating device 26 is accomplished by movement of the handle member 44 (e.g., by the user of the apparatus) from a first position (FIG. 5) to a second position (FIG. 6). Movement of the handle member 44 is accomplished by engaging the handle member 44 and forcing it through an arcuate motion along the path defined by the arcuate opening 38. Under normal operating conditions (i.e., with no internal jams in the camera), when the handle member 44 is in the first position, the latch member 40 is in an unlocked position (FIG. 5), out of alignment with the locking shelf 32. Correspondingly, under normal operating conditions, when the handle member 44 is in the second position, the latch member 40 is in a locked position (FIG. 6), in alignment with the locking shelf 32.

Figure 7:
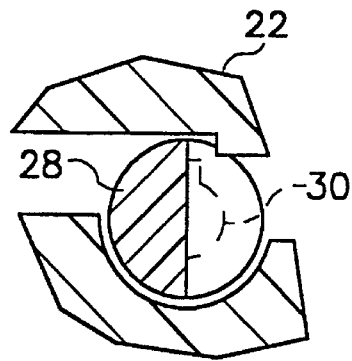
FIG. 7 is a section view of a film door of a thrust film cartridge with the film door in a closed position.
Figure 8:
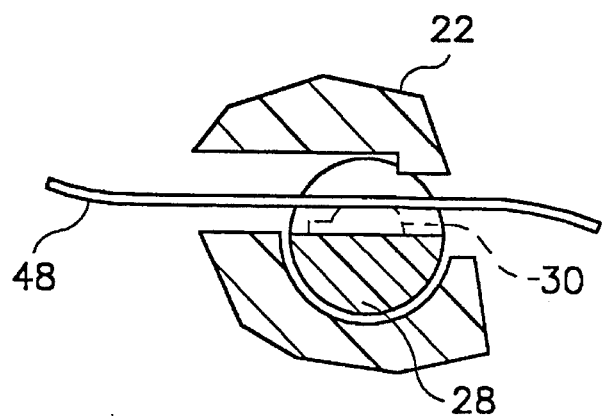
FIG. 8 is the section view of FIG. 7 with the film door in an open position and with film protruding out of the film door.

As can be seen in the figures, the pivot point of the actuating device 26 is coaxial with the lug member 42. That is, rotation of the actuating device 26 about its pivot point (e.g., by movement of the handle member 44) causes rotation of the lug member 42 about its central axis. In addition, the position of the pivot point (and, therefore, the position of the lug member 42) on the camera door 24 is such that the lug member 42 is in alignment with, and will be inserted into, the keyed socket 30 when the camera door 24 is closed (see FIGS. 2 and 3). Referring to FIGS. 5 and 6, under normal operating conditions, rotation of the handle member 44 from the first position to the second position results in rotation of the lug member 42 (shown in dashed lines) from the closed position (FIG. 5) to the open position (FIG. 6). In discussing the lug member 42, the terms "closed position" and "open position" refer to the state of the film door 28 when the lug member 42 is in engagement with the keyed socket 30. FIG. 7 illustrates the relative positioning of the lug member 42 (shown in dashed lines) and the film door 28 in the closed position, and FIG. 8 illustrates the relative positioning of the lug member 42 and the film door 28 in the open position.

Figure 9:
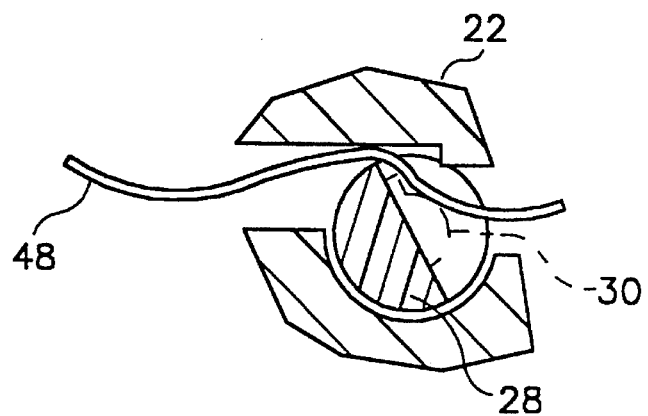
FIG. 9 is the section view of FIG. 7 with film jammed in the film door.
Figure 10:
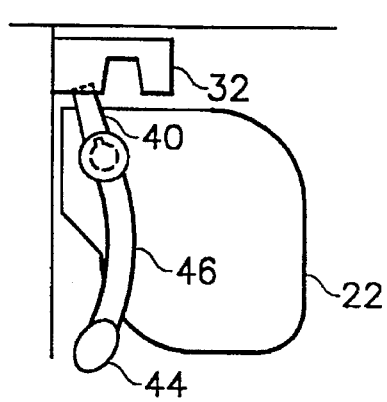
FIG. 10 is the view of FIG. 5 with the flexible member flexing due to film being jammed.

As noted briefly above, the flexible member 46 is designed to limit the force that can be applied by the handle member 44 to the latch and lug members 40,42. In the illustrated embodiment, the flexible member 46 includes a flexible arm that flexes and allows movement of the handle member 44 even though the latch member 40 and/or lug member 42 are restricted. Such flexing of the flexible arm 46 limits the torque which can be applied by the handle member 44 to the latch member 40 and lug member 42. In one embodiment, the torque which can be applied is about 1 oz-in or less. To allow for the flexing, the flexible arm 46 is made from polystyrene, polycarbonate, nylon or any other suitable material. The stiffness of the flexible arm 46 is such that it will adequately rotate the latch and lug members 40,42 under normal operating condition, but will not damage the camera or film 48 if a jam occurs. For example, if film 48 is extending from the thrust film cartridge 22 when the handle member 44 is rotated from the second position (FIG. 6) to the first position (FIG. 5) as shown in FIG. 9, the flexible arm 46 will flex, as shown in FIG. 10, and will not cause complete rotation of the lug member 42 and corresponding film door 28. By provision of the flexible arm 46, damage to the camera and film 48 can be avoided. Also, the camera door 24 will be prevented from opening when film 48 extends from the thrust film cartridge 22, as described below in more detail.

It should be noted that the arcuate opening 38 is wider than the handle member 44. Therefore, the bending of the flexible arm 46 will result in the handle member 44 moving out of the center of the arcuate path defined by the arcuate opening 38, but will not necessarily cause the handle member to contact the side of the arcuate opening 38.

Figure 11:
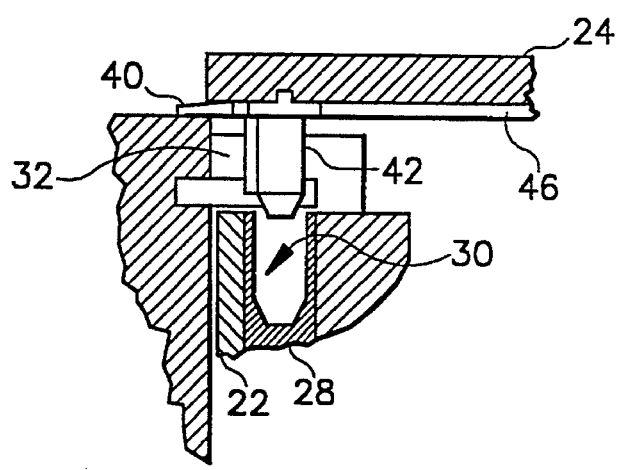
FIG. 11 is a section view taken along line 11—11 in FIG. 2 with the handle member in a second position and showing the latch member contacting an exterior surface of the locking shelf.

In use, to load and lock a thrust film cartridge 22 into the illustrated camera body 20, the cartridge 22 is first inserted into the camera body 20 (FIG. 1), and the camera door 24 is then closed with the handle member 44 in the first position and the latch member 40 in the unlocked position (FIGS. 2 and 5). It should be noted that the handle member 44 must be in the first position in order to close the camera door 24. That is, if the handle member 44 is not in the first position, the latch member 40 will not be in the unlocked position and will contact the exterior surface of the locking shelf 32 when the camera door 24 is closed, thereby preventing closure of the camera door 24, as illustrated in FIG. 11. This feature ensures that the lug member 42 is in the closed position when the camera door 24 is closed to facilitate proper orientation of the lug member 42 for insertion into the keyed socket 30.

Figure 12:
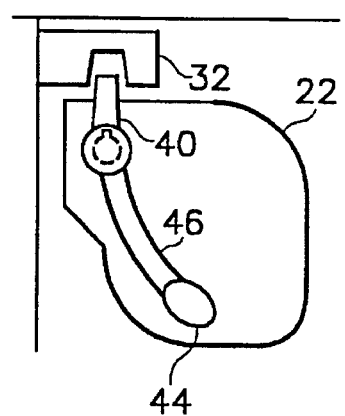
FIG. 12 is the view of FIG. 5 with the flexible member flexing due to the camera door not being closed sufficiently.

With the handle member 44 positioned in the first position, the camera door 24 can be closed, thereby inserting the lug member 42 into the keyed socket 30. Subsequent rotation of the handle member 44 from the first position to the second position (FIG. 6) will cause rotation of the latch member 40 from the unlocked position to the locked position to thereby lock the camera door 24 closed. In addition, such rotation of the handle member 44 will cause rotation of the lug member 42 from the closed position to the open position to thereby open the film door 28. If the camera door 24 is not completely closed when the handle member 44 is rotated to the closed position (i.e., the latch member 40 contacts the side surface of the locking shelf 32 rather than sliding behind it), the latch and lug members 40,42 will not rotate and no damage will be done to the camera due to the force limiting characteristics of the flexible arm 46. That is, although the handle member 44 can be moved toward its second position, the latch and lug members 40,42 will not rotate due to the interference of the latch member 40 with the side surface of the locking shelf 32, and the difference in rotation is accommodated by flexing of the flexible arm 46, as shown in FIG. 12.

It should be noted that the close proximity between the locking shelf 32 and the latch member 40 in the unlocked position (FIG. 5) ensures that the camera door 24 is locked to the camera body 20 during the initial movement of the handle member 44 in the counterclockwise direction, thereby locking the camera door 24 to the camera body 20 before the film door 28 of the thrust film cartridge 22 opens. This feature prevents the film door 28 from opening before the camera door 24 is securely locked in the closed position.

After the camera door 24 is securely locked and the film door 28 is opened, the camera may be utilized as usual. That is, film 48 may be thrust from the thrust film cartridge 22 into a film track (not shown) and positioned for exposure. When it is desired to remove the film 48 from the camera, the film 48 is rewound into the thrust film cartridge 22 and the cartridge 22 is removed from the camera body 20. In this regard, under normal operating conditions, the handle member 44 is rotated clockwise from the second position to the first position, thereby causing corresponding rotation of the latch member 40, to unlock the camera door 24, and the lug member 42, to closed the film door 28. However, if the film 48 is not completely wound back into the cartridge 22 (i.e., the film 48 extends from the cartridge 22 as shown in FIG. 9) when such rotation of the handle member 44 occurs, the film door 28 will become jammed. Without the provision of a flexible member 46, further rotation of the handle member 44 may result in damage to the film 48, and may further force the latch member 40 to the unlocked position, thereby allowing opening of the camera door 24 and resulting in unwanted exposure of the film 48 protruding from the cartridge 22. However, by providing a flexible member 46 interconnecting the handle member 44 to the latch and lug members 40,42, the handle member 44 will be allowed to move to its first position without forcing unwanted movement of the latch and lug members 40,42, as shown in FIG. 10. Thus, the camera door 24 will not be allowed to open when film 48 is extending from the cartridge 22.

Figure 13:
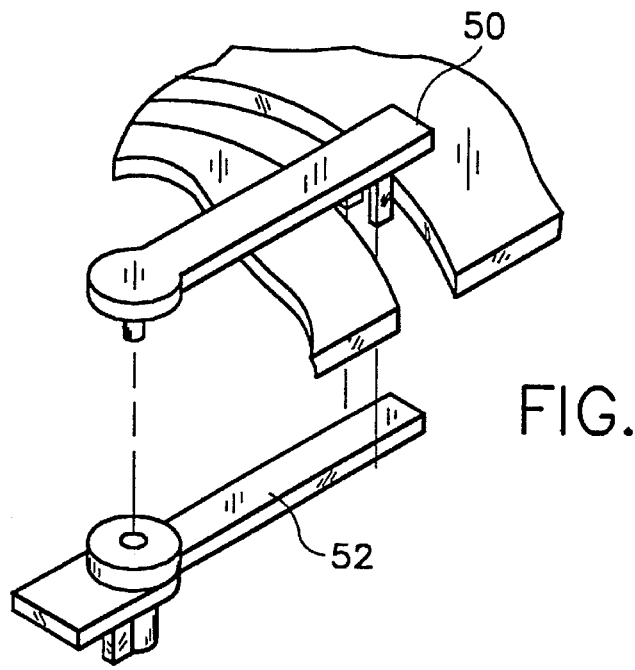
FIG. 13 is an exploded perspective view of an alternative embodiment of the actuating device of the present invention.

The flexible arm of the illustrated embodiment is only one way of providing the function of limiting the force applied by the handle member 44 on the latch and lug members 40,42. For example, an alternative embodiment is illustrated in FIG. 13 wherein a flexible arm similar to the above-described flexible arm is utilized. Instead of providing a handle member 44 protruding through the arcuate opening 38, the alternative embodiment utilizes an external lever member 50 which engages the end of a flexible arm 52 and pivots about the same center axis as the arcuate opening. In use, the lever member 50 can be rotated to cause movement of the end of the flexible arm 52. Under normal operating conditions, such movement will cause rotation of the flexible arm 52 and associated latch and lug members. On the other hand, if a jam occurs, the flexible arm 52 will bend and will not cause movement of the latch member and lug member 42.

Figure 14:
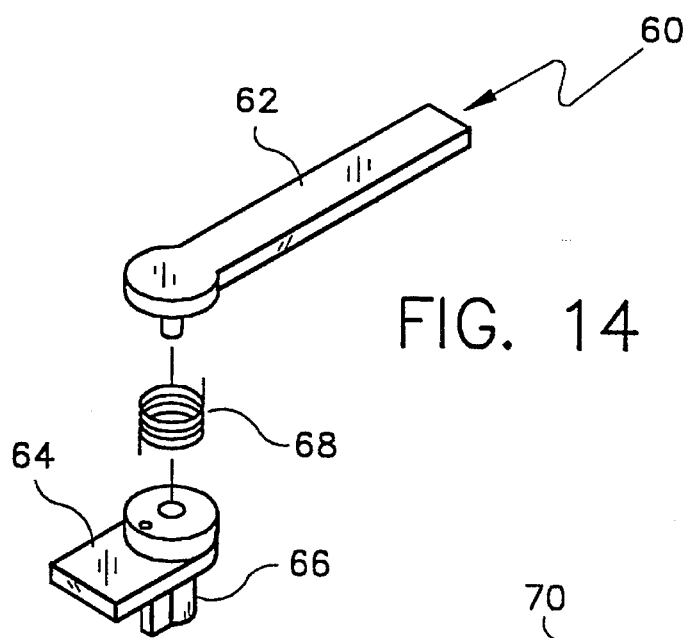
FIG. 14 is a perspective view of another alternative embodiment of the actuating device of the present invention.

Another embodiment of the device is illustrated in FIG. 14 wherein an actuating device 60 includes a lever member 62, a latch member 64, a lug member 66, and a torsion spring 68. The illustrated embodiment utilizes the torsion spring 68 in place of the flexible arm to limit the force which can be applied by the lever member 62 on the latch and lug members 64,66. That is, the torsion spring 68 is operatively positioned to allow relative movement between the lever member 62 and the latch and lug members 64,68 during a jamming situation.

Figure 15:
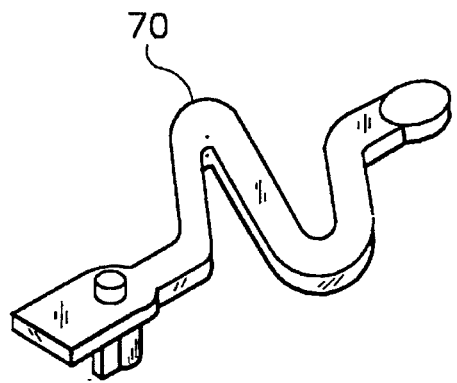
FIG. 15 is a perspective view of yet another alternative embodiment of the actuating device of the present invention.

FIG. 15 illustrates yet another embodiment of the actuating device. The device includes a tortuous arm 70 in place of the flexible arm described above. The tortuous arm acts in a manner similar to that of the flexible arm in that it flexes in response to the lug member or latch member being jammed. The tortuous shape of the tortuous arm accommodates flexing by allowing greater flexing than a straight arm of similar cross section.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

ELEMENTS IDENTIFIED BY REFERENCE NUMERAL

| Reference Numeral | Element |
|---|---|
| 20 | camera body |
| 22 | thrust cartridge |
| 24 | camera door |
| 26 | actuating device |
| 28 | film door |
| 30 | socket |
| 32 | locking shelf |
| 34 | hinge |
| 36 | pivot boss |
| 38 | arcuate opening |
| 40 | latch member |
| 42 | lug member |
| 44 | handle member |
| 46 | flexible member |
| 48 | film |
| 50 | external lever member |
| 52 | flexible arm |
| 60 | actuating device |
| 62 | lever member |
| 64 | latch member |
| 66 | lug member |
| 68 | torsion spring |
| 70 | tortuous arm |

What is claimed is:

1. An apparatus for receiving a thrust film cartridge and for moving a film door between open and closed positions, said apparatus comprising:
   (a) a camera body having a cartridge compartment adapted to receive a thrust film cartridge;
   (b) a camera door interconnectable with said camera body, said camera door being movable relative to said camera body between an open position, to allow insertion and removal of a thrust film cartridge from said cartridge compartment, and a closed position, to form a substantially light tight seal over said cartridge compartment; and
   (c) an actuating device comprising:
      (i) a latch member movable between a locked position, to lock said camera door in said closed position, and an unlocked position, to allow said camera door to move between said open and closed positions;
      (ii) a lug member operatively associated with said latch member, said lug member being engageable with a film door of a thrust film cartridge to move the film door between open and closed positions;
      (iii) a handle member operatively associated with said latch member, said handle member being movable by a user of said apparatus to provide an unlocking force to said latch member and to move said latch member from said locked position to said unlocked position; and
      (iv) force limiting means for limiting the force which can be applied by said handle member on said latch member.

2. An apparatus, as claimed in claim 1, wherein said actuating device is mounted on said camera door.

3. An apparatus, as claimed in claim 1, wherein said latch member pivots between said locked and unlocked positions.

4. An apparatus, as claimed in claim 3, wherein said handle member can apply a torque to said latch member, said torque being about 2 oz-in or less.

5. An apparatus, as claimed in claim 1, wherein said force limiting means comprises a flexible member operatively interconnecting said handle member to said latch member.

6. An apparatus, as claimed in claim 5, wherein said flexible member is pivotally positioned on an interior of said apparatus, and wherein said handle member is at least partially exposed to an exterior of said apparatus.

7. An apparatus, as claimed in claim 6, wherein said handle member comprises a lever member pivotally positioned on an exterior of said apparatus.

8. An apparatus, as claimed in claim 5, wherein said flexible member is tortuous in shape.

9. An apparatus, as claimed in claim 5, wherein said flexible member comprises a torsion spring operatively interconnecting said handle member to said latch member.

10. An apparatus, as claimed in claim 5, wherein said camera door includes a slotted opening for allowing operative interconnection between said handle member and said flexible member.

11. An apparatus, as claimed in claim 10, wherein said slotted opening is arcuate in shape.

12. An apparatus for receiving a thrust film cartridge and for moving a film door between open and closed positions, said apparatus comprising:
(a) a camera body having a cartridge compartment adapted to receive a thrust film cartridge;
(b) a camera door interconnectable with said camera body, said camera door being movable relative to said camera body between an open position, to allow insertion and removal of a thrust film cartridge from said cartridge compartment, and a closed position, to form a substantially light tight seal over said cartridge compartment; and
(c) an actuating device comprising:
(i) a latch member pivotable between a locked position, to lock said camera door in said closed position, and an unlocked position, to allow said camera door to move between said open and closed positions;
(ii) a lug member operatively associated with said latch member, said lug member being engageable with a film door of a thrust film cartridge to rotate the film door between open and closed positions;
(iii) a handle member operatively associated with said latch member, said handle member being pivotable by a user of said device to cause pivoting of said latch member between said locked and unlocked positions; and
(iv) torque limiting means for limiting the torque which can be applied by said handle member to said latch member.

13. An apparatus, as claimed in claim 12, wherein said handle member is pivotable by a user of said apparatus to provide an unlocking torque to said latch member and to move said latch member from said locked position to said unlocked position.

14. An apparatus, as claimed in claim 12, wherein said actuating device is mounted on said camera door.

15. An apparatus, as claimed in claim 12, wherein a torque applied by said handle member to said latch member comprises about 2 oz-in or less.

16. An apparatus, as claimed in claim 12, wherein said torque limiting means comprises a flexible member operatively interconnecting said handle member to said latch member.

17. An apparatus, as claimed in claim 12, wherein said camera door includes a slotted opening for allowing access to said handle member.

18. An apparatus, as claimed in claim 17, wherein said slotted opening is arcuate in shape.

19. An apparatus for receiving a thrust film cartridge and for moving a film door between open and closed positions, said apparatus comprising:
(a) a camera body having a cartridge compartment adapted to receive a thrust film cartridge;
(b) a camera door interconnectable with said camera body, said camera door being movable relative to said camera body between an open position, to allow insertion and removal of a thrust film cartridge from said cartridge compartment, and a closed position, to form a substantially light tight seal over said cartridge compartment, said camera door including a slotted arcuate opening; and
(c) an actuating device pivotably mounted on said camera door, said actuating device comprising:
(i) a latch member pivotable between a locked position, to lock said camera door in said closed position, and an unlocked position, to allow said camera door to move between said open and closed positions;
(ii) a lug member operatively associated with said latch member, said lug member being engageable with a film door of a thrust film cartridge to rotate the film door between open and closed positions;
(iii) a handle member operatively associated with said latch member, said handle member extending through said arcuate opening and being pivotable by a user of said apparatus to provide an unlocking torque to said latch member and to rotate said latch member from said locked position to said unlocked position; and
(iv) a flexible member pivotally positioned on an interior of said apparatus and operatively interconnecting said handle member with said latch member, said flexible member limiting the torque which can be applied by said handle member on said latch member.

20. A method for loading a thrust film cartridge into and removing the cartridge out of a camera, wherein the cartridge includes a film door, wherein the camera includes a camera body, a camera door, and an actuating device, and wherein the actuating device includes a latch member, a lug member, a handle member, and a flexible member operatively interconnecting said handle member with said latch member, said method comprising the steps of:

inserting the thrust film cartridge into the camera body with the film door in a closed position;

closing the camera door with the handle member in a first position and the latch member in an unlocked position;

moving the handle member to a second position to cause movement of the latch member to a locked position;

moving the film door to an open position;

thrusting film from the cartridge;

moving the handle member from the second position toward the first position while film is extending from the cartridge; and flexing the flexible member, thereby preventing the latch member from reaching the unlocked position.

21. A method, as claimed in claim 20, wherein said step of moving the handle member to a second position comprises moving the handle member along an arcuate path to cause rotation of the latch member to a locked position and rotation of the lug member to an open position.

* * * * *